United States Patent
Anthony

(10) Patent No.: US 6,378,836 B1
(45) Date of Patent: Apr. 30, 2002

(54) LAY-UP MOLD

(75) Inventor: Parme Gerald Anthony, Laguna Hills, CA (US)

(73) Assignee: UCAR Carbon Company, Inc., Wilmington, DE (US)

(*) Notice: Subject to any disclaimer, the term of this patent is extended or adjusted under 35 U.S.C. 154(b) by 0 days.

(21) Appl. No.: 09/416,659

(22) Filed: Oct. 12, 1999

(51) Int. Cl.$^7$ ................................................. B28B 7/36
(52) U.S. Cl. ..................... 249/114.1; 249/115; 249/135; 249/139; 425/470
(58) Field of Search .............................. 249/114.1, 115, 249/117, 134, 135, 139, 205; 425/403, 470; 264/219, 220

(56) References Cited

U.S. PATENT DOCUMENTS

| | | | | | |
|---|---|---|---|---|---|
| 2,356,860 A | * | 8/1944 | Lewis | .......................... | 425/389 |
| 2,892,238 A | * | 6/1959 | Budd | ........................... | 249/32 |
| 4,017,051 A | * | 4/1977 | Scott et al. | ................... | 249/50 |
| 4,643,864 A | * | 2/1987 | Martini | ....................... | 264/220 |
| 4,863,663 A | * | 9/1989 | Nico, Jr. et al. | ............ | 264/130 |
| 4,946,552 A | * | 8/1990 | Omine | ........................ | 156/250 |
| 5,802,696 A | * | 9/1998 | Zuccarini | ..................... | 29/468 |

* cited by examiner

Primary Examiner—Nam Nguyen
Assistant Examiner—Donald Heckenberg
(74) Attorney, Agent, or Firm—James R. Cartiglia

(57) ABSTRACT

A lay-up mold is disclosed. The mold comprises a multi-sided vertically extending frame formed of sheet steel. A plurality of spaced apart vertically extending ribs also formed of sheet steel are positioned within the frame and rigidly affixed thereto, the ribs having upper edges which conform to the shape of the mold surface. The mold also comprises a plurality of spaced apart vertically extending partition elements formed of sheet steel positioned within the frame which transverse the ribs and rigidly and are affixed to the frame, with the partition elements having upper edges which conform to the shape of the mold surface. A layer of perforated sheet steel is rigidly affixed to the frame and the upper edges of the ribs and partition elements, with a coating of polyurethane overlying and bonded to and interlocked with the perforated sheet steel, the coating forming the mold surface.

6 Claims, 5 Drawing Sheets

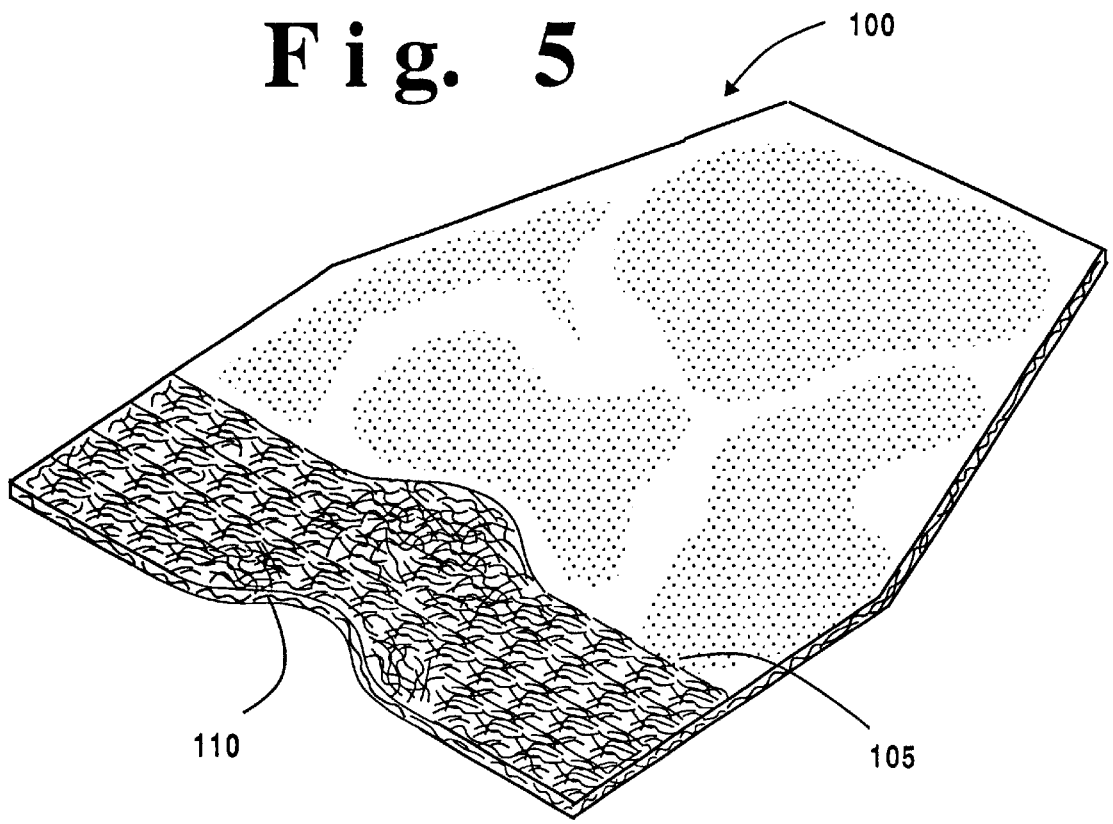

LAY-UP MOLD

The present invention relates to a mold for forming a composite article having a precisely contoured outer surface for high performance applications such as air foil and satellite surfaces.

More particularly, the present invention is directed to a relatively inexpensive lay-up mold which is light weight and of uncomplicated design.

BACKGROUND OF THE INVENTION

Precisely contoured, high performance outer surfaces are required for many components of aircraft, satellite and similar applications. These components are commonly made from composite materials, i.e. sheets of carbon or graphite fiber impregnated with resin and subsequently cured.

The sheets of composite material are provided with the desired precise contour by laying a composite sheet on a precision contoured surface, e.g. high density polyurethane foam which has been machined to match the desired surface using state-of-the-art procedures.

The precision contoured surface forms part of a "lay-up" mold which, up to this time, have been expensive, cumbersome assemblies.

SUMMARY OF THE INVENTION

The present invention is a lay-up mold comprising:

a multi-sided vertically extending frame formed of steel sheet;

a plurality of spaced apart, vertically extending, ribs formed of steel sheet positioned within said frame and rigidly affixed thereto, said ribs having upper edges which conform to a pre-determined mold surface;

a plurality of spaced apart vertically extending partition elements formed of steel sheet positioned within the frame transverse to said ribs and rigidly affixed to the frame and the ribs and being vertically co-extensive therewith to define open-topped compartments within the frame; said partition elements having upper edges which conform to said pre-determined mold surface;

a base member formed of one or more layers of perforated steel sheet rigidly affixed to the frame and the upper edges of the ribs and partition elements; and a coating of polyurethane overlying and bonded to and interlocked with the perforated steel sheet, the coating conforming to the predetermined mold surface.

BRIEF DESCRIPTION OF THE DRAWINGS

FIG. 5 shows a molded article resulting from the mold of FIG. 4.

DESCRIPTION OF THE INVENTION

Figure 1:
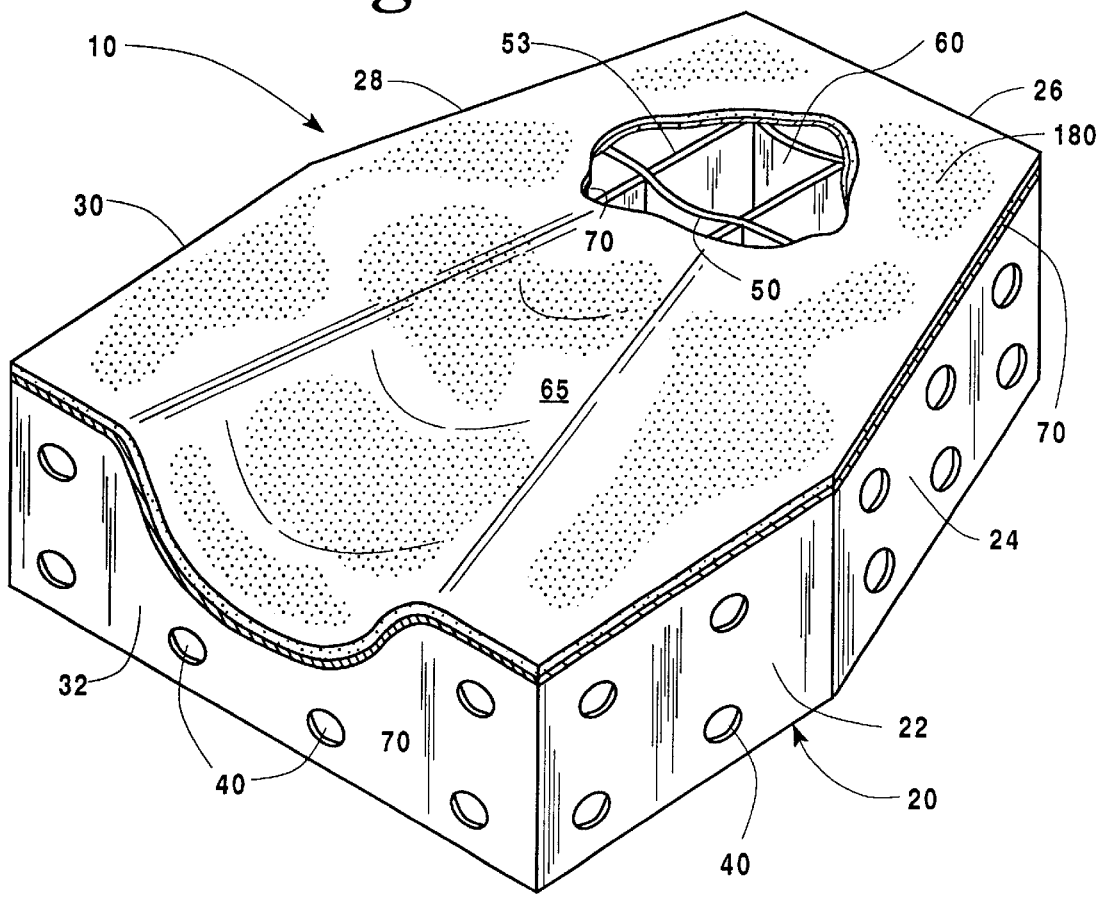
FIG. 1 shows a perspective view, partly in section, of a lay-up mold in accordance with the present invention.
Figure 2:
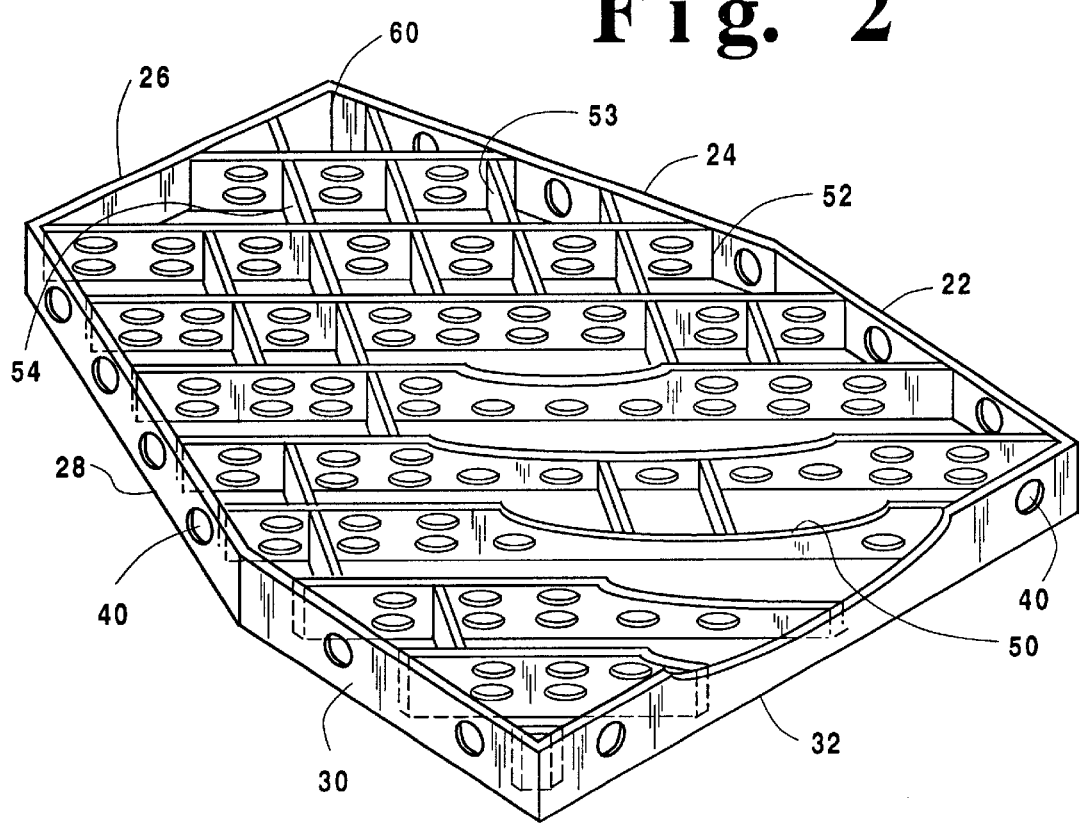
FIGS. 2, 2A, 2B illustrate the frame of the lay-up mold of the present invention.
Figure 2A:
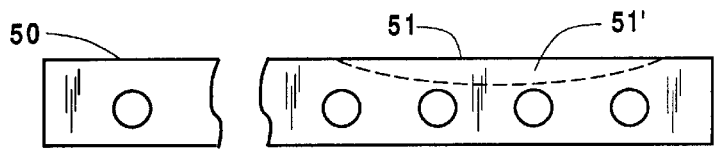
Figure 2B:

With reference to FIG. 1, a lay-up mold in accordance with the present invention is indicated at 10 comprising a vertically extending frame 20 which is multi-sided with sides 22, 24, 26, 28, 30 and 32 formed of steel sheet, e.g. plain carbon steel, as also shown in FIG. 2, with the cut-outs 40 being provided to decrease the weight of frame 20. A plurality of spaced apart vertically extending ribs 50 also formed of steel sheet are positioned within the frame 20, extending between the sides 26, 24; 28, 22; 30, 32 and rigidly affixed to frame 20, e.g. by welding as indicated at 52. A plurality of spaced apart, vertically extending partition elements 53, also formed of steel sheet, are positioned within the frame 20 and rigidly affixed therein, e.g. by welding as indicated at 54. Partition elements 53 extend transverse to adjoining ribs 50 and form open topped compartments 60. The upper edges 54 of partition elements 53, and the upper edges 51 of ribs 50, with reference to 51', 54', FIGS. 2A, 2B conform to a predetermined mold surface indicated at 65 in FIG. 1.

Figure 3:
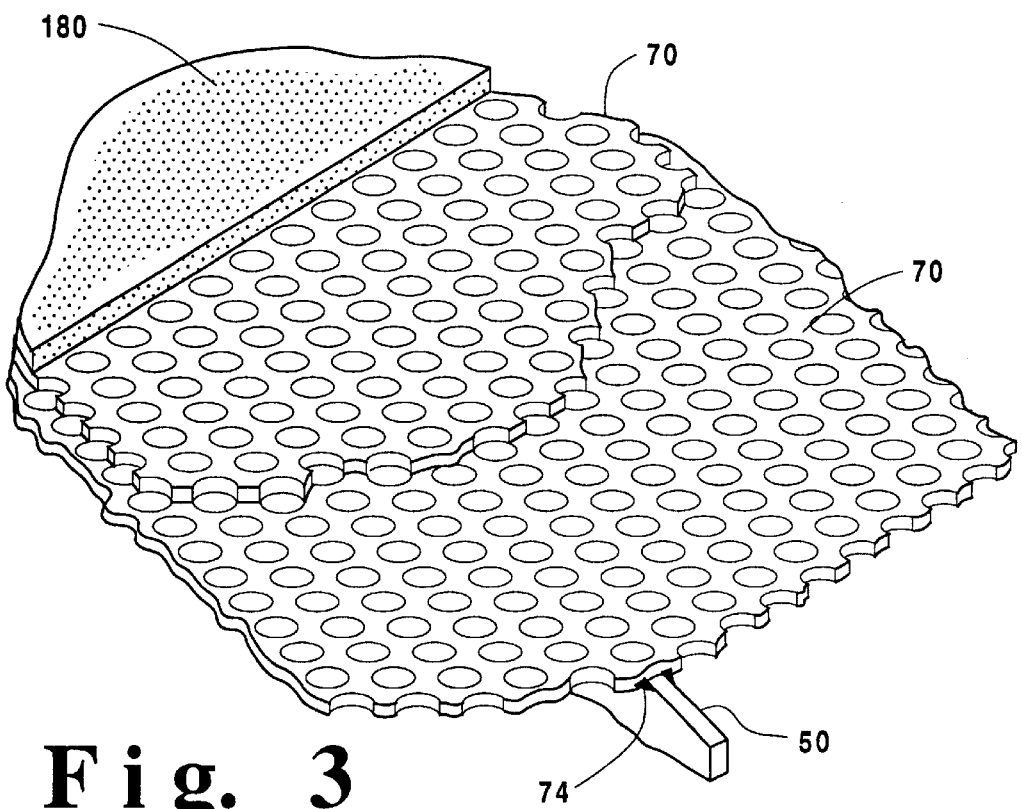
FIGS. 3, 3A–C illustrate a base member for a lay-up mold of the present invention.
Figure 3A:
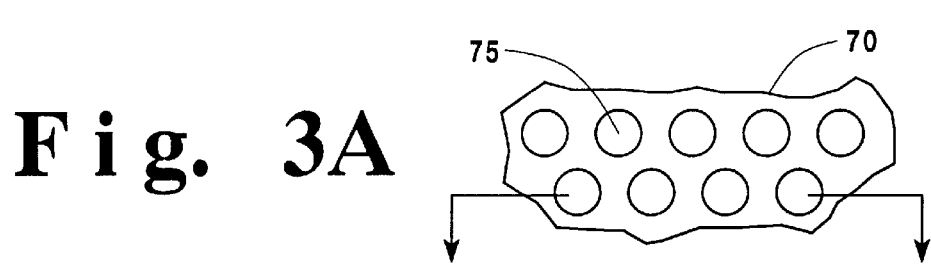
Figure 3B:
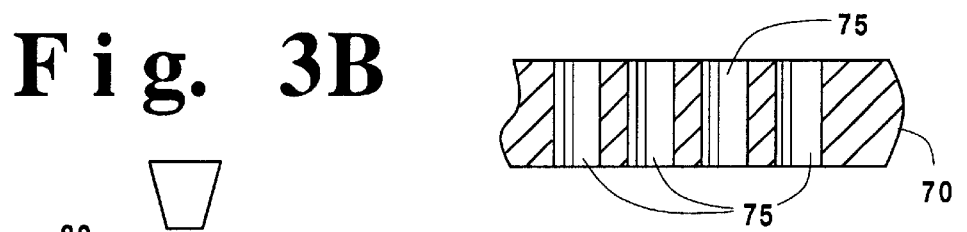
Figure 3C:
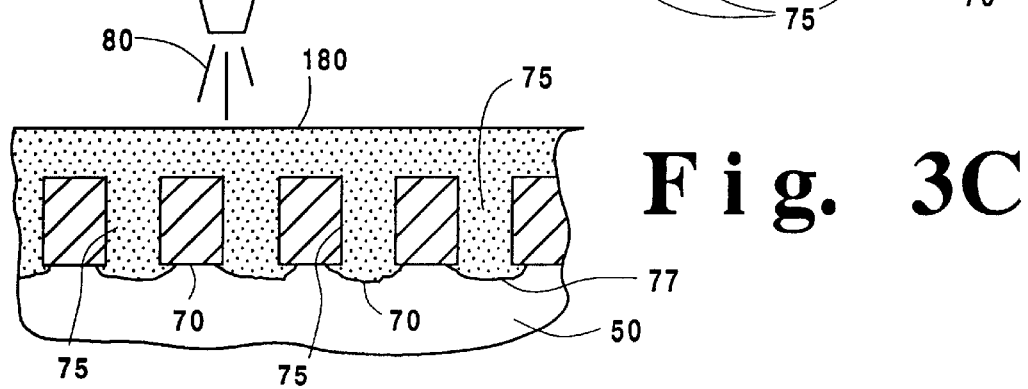
Figure 4:
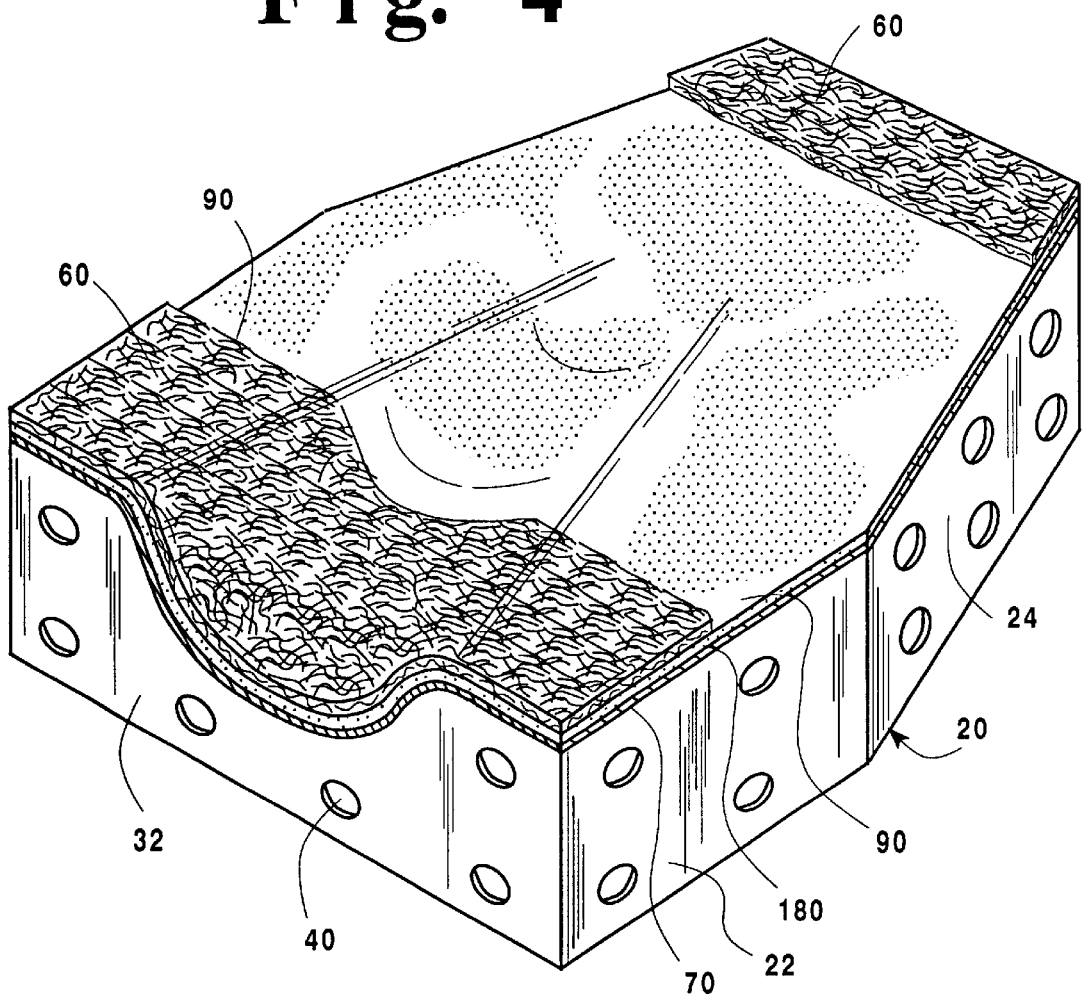
FIG. 4 is a somewhat more detailed view of the lay-up mold of FIG. 1.

With reference to FIGS. 3, 3A, 3B, and 3C, perforated steel sheet, indicated at 70, in one or more layers, is fitted to the upper edges of ribs 50, and partition elements 53, e.g. by hand pressure, and affixed thereto, e.g. by welding as indicated at 74 in FIG. 3A. Polyurethane is sprayed from nozzle 80 as shown in FIG. 3C, onto perforated steel sheet 70, shown also in FIG. 3A, and a coating of polyurethane foam 180 is formed on perforated steel sheet 70 and adheres thereto and interlocks with perforated steel sheet 70 by filling apertures 75 and forming anchors of polyurethane foam underneath the perforated steel sheet 70 as shown at 77 in FIG. 3C. The perforated steel sheet 70, with a conformal coating 180 of polyurethane foam supported on frame 20, ribs 50 and spacer elements 53 represents a lay-up mold in accordance with the present invention as shown in FIG. 1. The conformal polyurethane coating 180 can be optimized to the degree required by conventional programmed machine tool treatment. With the polyurethane layer 180 satisfactorily contoured, a flexible sheet of resin impregnated carbon or graphite cloth 90, with the resin partially cured is laid on polyurethane layer 180 and conformed to the contour of the layer 180, suitably using conventional autoclave pressurization or vacuum techniques, while heating the sheet to fully cure the resin. The resulting molded article 100 is shown in FIG. 5, after removal from a mold 10. The precision contoured surface of the article is indicated at 105. The underlying surface 110 is only nominally conformal.

The lay-up mold of the present invention is easily constructed of inexpensive, relatively light material, i.e. steel sheet to which is anchored an easily contoured polyurethane layer; the mold is easily assembled and transported.

What is claimed is:

1. Lay-up mold frame comprising:
   (i) a multi-sided vertically extending frame formed of steel sheet;
   (ii) a plurality of spaced apart, vertically extending ribs formed of steel sheet positioned within said frame and rigidly affixed thereto, said ribs having upper edges which conform to a pre-determined mold surface;
   (iii) a plurality of spaced apart vertically extending partition elements formed of steel sheet positioned within said frame transverse to said ribs and rigidly affixed to said frame and said ribs and being vertically co-extensive therewith to define open-topped compartments within said frame; said partition elements having upper edges which conform to said pre-determined mold surface; and
   (iv) a layer of perforated steel sheet rigidly affixed to said frame and said upper edges of said ribs and partition elements.

2. Lay-up mold comprising:
(i) a multi-sided vertically extending frame formed of steel sheet;
(ii) a plurality of spaced apart, vertically extending ribs formed of steel sheet positioned within said frame and rigidly affixed thereto, said ribs having upper edges which conform to a pre-determined mold surface;
(iii) a plurality of spaced apart vertically extending partition elements formed of steel sheet positioned within said frame transverse to said ribs and rigidly affixed to said frame and said ribs and being vertically co-extensive therewith to define open-topped compartments within said frame; said partition elements having upper edges which conform to said pre-determined mold surface;
(iv) a layer of perforated steel sheet rigidly affixed to said frame and said upper edges of said ribs and partition elements; and
(v) a coating of polyurethane overlying and bonded to and interlocked with said perforated steel sheet, said coating conforming to said pre-determined mold surface.

3. A lay-up mold apparatus, comprising:
a supporting framework;
a layer of perforated steel sheet supported by the framework; and
a coating of polymeric material overlying the perforated steel sheet, the polymeric material filling the perforations of the perforated steel sheet so that the coating is thereby interlocked with the perforated steel sheet, the coating defining a mold surface;
wherein the supporting framework includes:
  a perimeter frame formed of steel sheet;
  a plurality of vertical ribs, formed of steel sheet, attached to and extending across the perimeter frame;
  a plurality of vertically extending partition elements, formed of steel sheet, attached to and extending between the ribs; and
  the perimeter frame, the ribs, and the partition elements having upper edges supporting the layer of perforated sheet in the shape of the mold surface.

4. The apparatus of claim 3, further comprising:
a second layer of perforated steel sheet underlying the first layer of perforated steel sheet.

5. The apparatus of claim 3, wherein:
the coating is applied by spraying a liquid polymeric material onto the perforated steel sheet.

6. The apparatus of claim 3, wherein:
the polymeric material is polyurethane.

* * * * *

UNITED STATES PATENT AND TRADEMARK OFFICE
CERTIFICATE OF CORRECTION

PATENT NO.   : 6,378,836 B1
DATED        : April 30, 2002
INVENTOR(S)  : Anthony, Parme Gerald It is certified that error appears in the above-identified patent and that said Letters Patent is hereby corrected as shown below:

<u>Column 3,</u>
Line 27, "work; and" should read as -- work; --

<u>Column 4,</u>
Line 17, "rated sheet in the shape of the mold surface" should read as -- rated steel sheet in the shape of the mold surface --

Signed and Sealed this

Tenth Day of September, 2002

*Attest:*

*Attesting Officer*

JAMES E. ROGAN
*Director of the United States Patent and Trademark Office*